United States Patent [19]
Haller

[11] 3,942,415
[45] Mar. 9, 1976

[54] POWER CYLINDER CONSTRUCTION

[75] Inventor: Roland Haller, Shiloh, Ohio

[73] Assignee: Harsco Corporation, Camp Hill, Pa.

[22] Filed: Mar. 27, 1974

[21] Appl. No.: 455,063

[52] U.S. Cl. .................. 92/118; 92/128; 92/169
[51] Int. Cl.² .................. F01B 15/04; F16J 11/00
[58] Field of Search ............. 92/118, 119, 128, 169; 91/169

[56] References Cited
UNITED STATES PATENTS

| | | | |
|---|---|---|---|
| 2,899,938 | 8/1959 | Gardner | 92/128 |
| 3,113,490 | 12/1963 | Weaver | 92/118 |
| 3,279,755 | 10/1966 | Notemboom et al. | 91/169 |
| 3,421,786 | 1/1969 | Panigati | 92/128 |
| 3,483,798 | 12/1969 | Parrett et al. | 91/169 |
| 3,494,652 | 2/1970 | Langland | 92/128 |

*Primary Examiner*—Paul E. Maslousky
*Attorney, Agent, or Firm*—Palmer Fultz

[57] ABSTRACT

A fluid actuated power cylinder comprising a housing means and attached base means for pivotal mounting of the cylinder characterized by a structural arrangement for strongly attaching the base by welding techniques without causing heat imposed distortion of cylindrical surfaces of the working surfaces. The apparatus is further characterized by a quickly detachable base plate construction which permits ready access to the interior components of the cylinder via the base end thereof.

2 Claims, 4 Drawing Figures

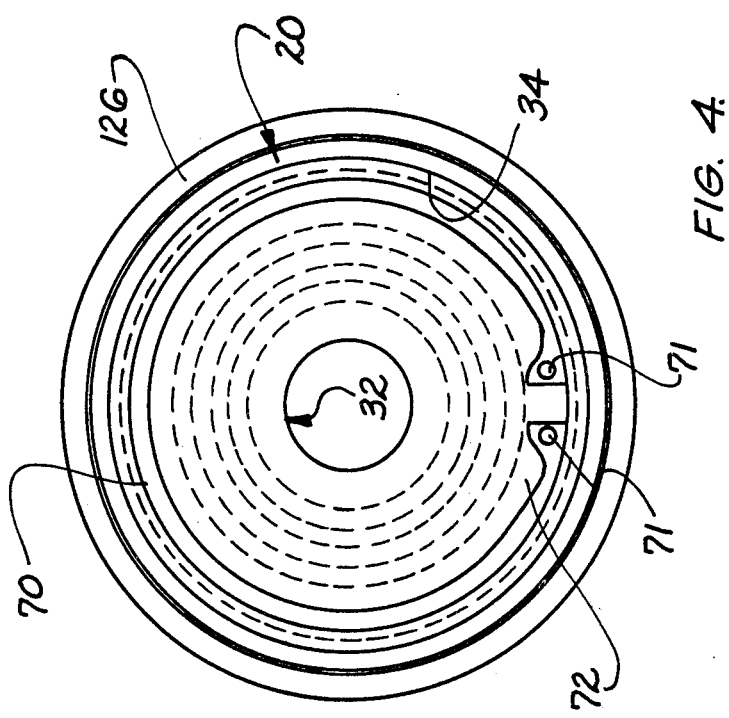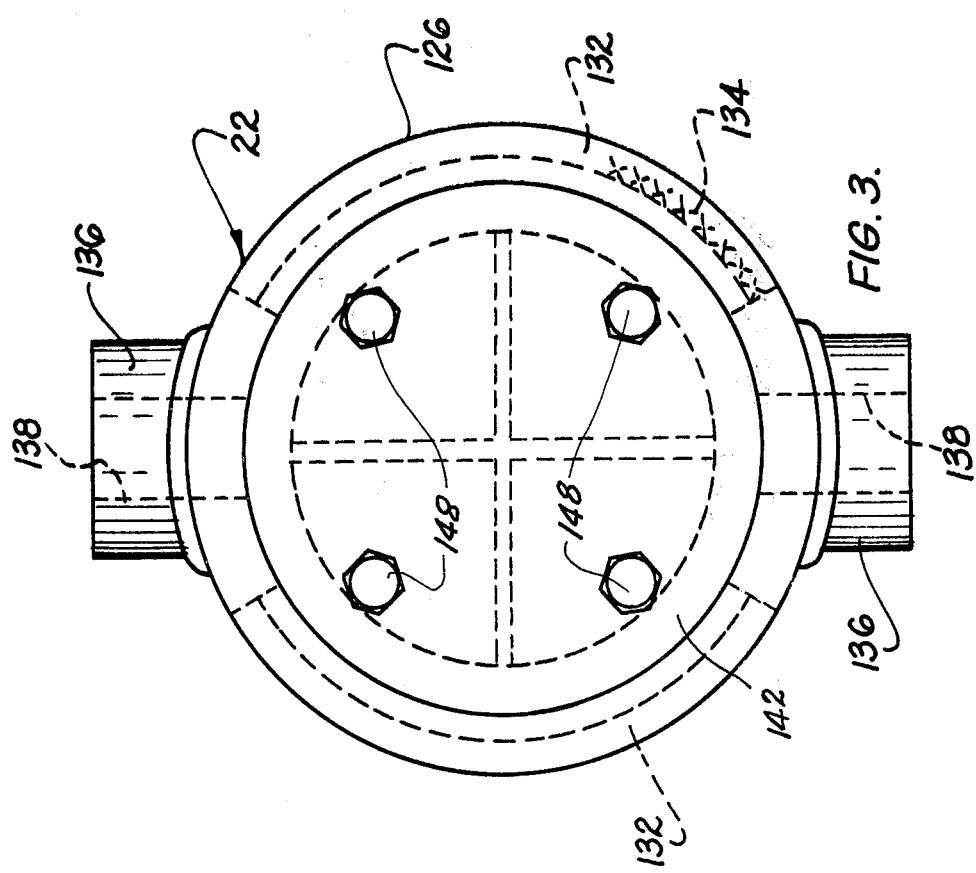

POWER CYLINDER CONSTRUCTION

BACKGROUND OF THE INVENTION

This invention relates to fluid actuated power cylinders and more particularly to a novel cylinder base construction for apparatus of this type.

More particularly, the power cylinder comprises a tubular housing means for containing the piston and ram apparatus, which housing means is provided with a novel base means for pivotally mounting the cylinder to a base pivot, and includes a novel structural arrangement that makes possible forming a welded junction between the tubular housing means and the base means without causing heat imposed distortion of the cylindrical surfaces of the interior components of the power cylinder.

The novel power cylinder is further provided with a quick detachment structural arrangement for a base plate means which provides ready access to the interior components of the device.

PROBLEMS IN THE ART

In the construction of power cylinders of the large industrial type, such as are used on truck dump bodies, there has been the practice in the art to fabricate such cylinders by welding base end plates directly to the cylindrical housing and such mounting practices have presented a problem in that heat imposed distortion of the cylindrical working surfaces has often occurred with resulting distortion of the interior cylindrical working surfaces. Hence remachining of such surfaces after welding has often been required.

Also in such prior power cylinder construction the end closures for the base end and ram end have generally been welded in place making access to the interior of the power cylinder by breaking of the welds relatively difficult when disassembly for servicing and repair becomes necessary.

SUMMARY OF THE INVENTION

In accordance with the present invention, the above mentioned power cylinder is provided with a unique base means structure provided with a bore for receiving the base end of the cylindrical housing, as well as arcuate welding access slots positioned at the extreme rear edge of the cylindrical housing such that the formation of the subsequent mounting weldment will not produce heat imposed distortion of the closely machined internal working surfaces of the power cylinder.

As another aspect of the present invention the above mentioned cylindrical housing is provided with a quick detachment base plate construction and the above mentioned novel base means in provided with an access opening axially aligned with said base plate so as to permit its easy removal and replacement thereby facilitating servicing and repair of the device.

It is therefore an object of the present invention to provide a novel power cylinder that includes housing base means uniquely adapted for rapid assembly and disassembly.

It is another object of the present invention to provide a novel power cylinder that includes an improved base means construction that can be ruggedly mounted on the device by welding without causing heat imposed distortion of machined surfaces of the internal working components.

Further objects and advantages of the present invention will be apparent from the following description, reference being had to the accompanying drawings wherein a preferred form of embodiment of the invention is clearly shown.

BRIEF DESCRIPTION OF THE DRAWINGS

FIG. 3 is an end elevational view of the apparatus of FIG. 1; and

FIG. 4 is an end sectional view of the apparatus of FIG. 1, the section being taken along the line 4—4 of FIG. 1.

DESCRIPTION OF THE PREFERRED EMBODIMENT

Figure 1:
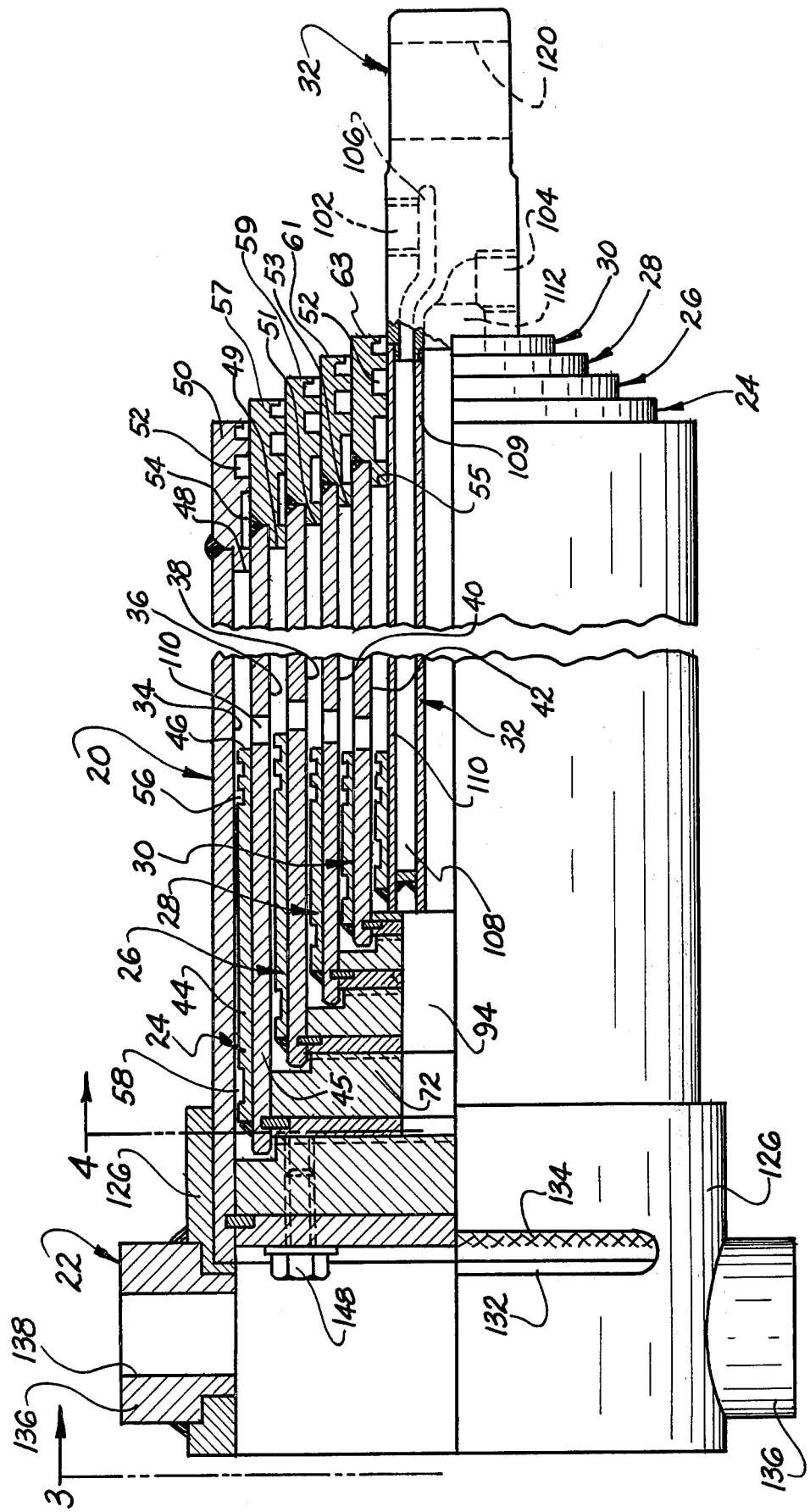
FIG. 1 is a side elevational view, partially in section, of a power cylinder constructed in accordance with the present invention, the section being taken along a vertical plane through the centerline of the apparatus.

Referring in detail to the drawings, FIG. 1 illustrates a power cylinder constructed in accordance with the present invention which comprises an outer tubular housing means indicated generally at 20, and a base means indicated generally at 22, the latter including a unique base plate construction 140–142 removably attached to with respect to the housing means in a manner later to be described.

Housing means 20 contains a plurality of piston and cylinder tube assemblies, the first stage being indicated generally at 24. The second, third, and fourth stage tube assemblies are indicated generally at 26, 28 and 30 respectively and a central ram assembly, comprising the fifth stage is indicated generally at 32.

Housing 20 includes an inner cylindrical surface 34 and the cylindrical inner surfaces of the successive stages are designated 36, 38 and 40.

Each of the above mentioned stages includes an outer piston sleeve 44, the end of which comprises an abutment 46 that is arrested by a respective stop 48, 49, 51, 53, or 55 provided by permanently attached end caps 50, 57, 59, 61, or 63, the latter including seals 52 and inernal wear rings 54.

It should be mentioned that the annular piston sleeves 44 are provided with seals 56 and wear rings 58.

Figure 2:
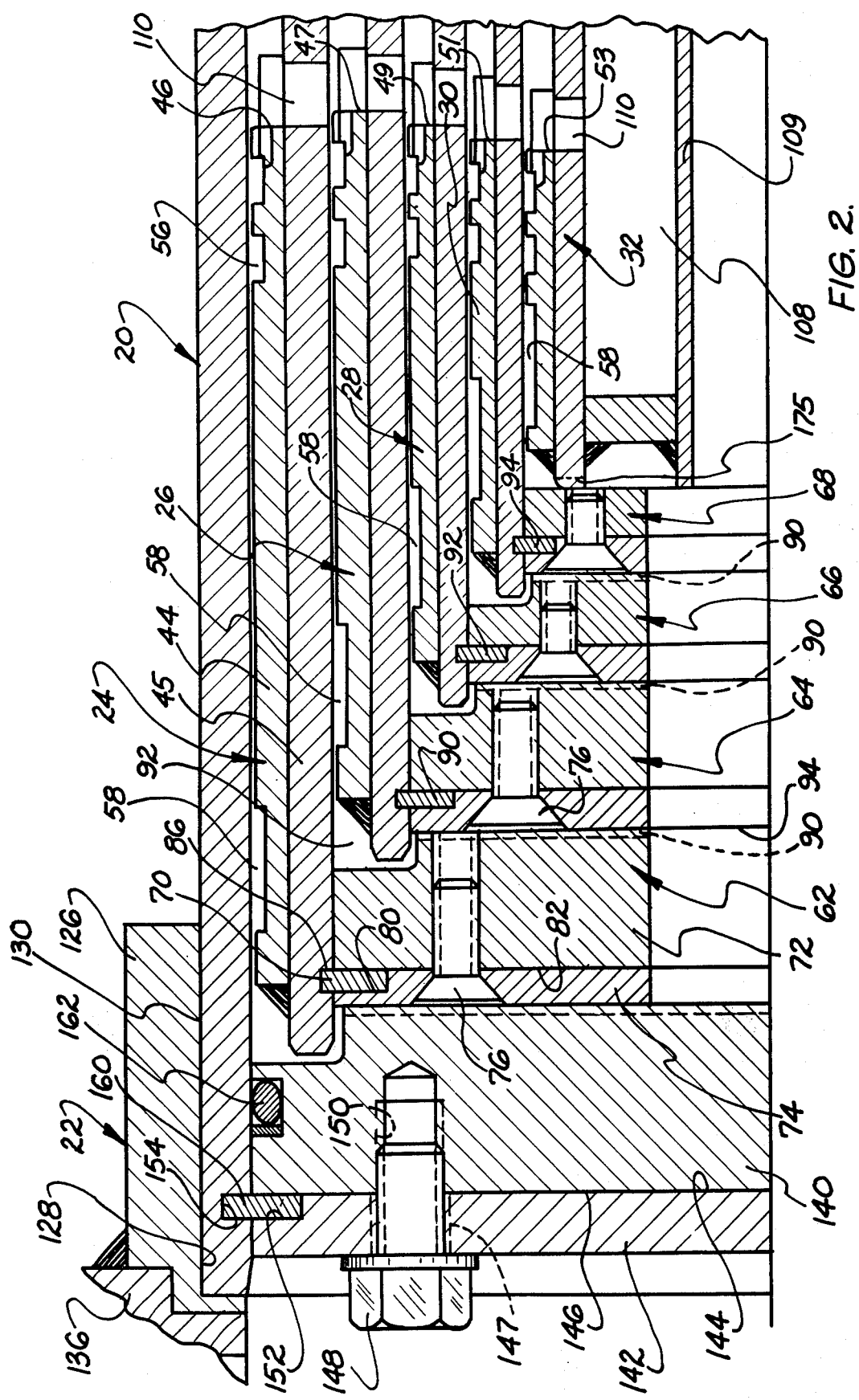
FIG. 2 is a partial enlarged sectional view corresponding to FIG. 1.

Referring particularly to FIG. 2, each of the piston and cylinder tube assemblies 24 through 30 includes a respective transfer disc 62, 64, 66, and 68. Each transfer disc is secured to its respective cylindrical member by a snap ring such as the relatively large snap ring 70 used in the first stage.

Referring particularly to the first stage, transfer disc 62 comprises confronting disc members 72 and 74 joined together by a plurality of cap screws 76 and the surface 78 of disc member 74 is provided with an annular recess 80, which recess together with the surface 82 on disc member 72 form a slot that confronts a second annular slot 86 with said confronting slots serving to mount the previously mentioned snap ring 70.

It will now be understood that when cap screws 76 are removed the disc member 74 can be pulled outwardly from cylindrical member 45 thereby permitting removal of snap ring 70 and the inner disc member 72.

Each of the succeeding second, third and fourth stages are of the same construction. However, here the snap rings 90, 92, and 94 are of lighter construction since they are not required to resist axial stresses as high as those imposed on the larger diameter first stage.

It should next be mentioned that oil passages 90 are provided between the confronting faces of the transfer discs 62, 64, and 66 such that oil cannot be trapped between the stages, for example, in the annular space 92 between the first and second stages. It will be understood that fluid is free to pass from the annular space 92 via oil passage 90 to a central chamber 94 formed by openings in the center of the transfer discs.

Referring next to the central ram indicated generally at 32, it should be pointed out that since the cylinder is of the double acting type it necessarily includes two oil inlet-outlet openings 102 and 104. When port 102 is pressurized fluid will flow via passage 106, annular chamber 108 and thence through the axial bores 110 to the end surfaces 46–53 of the piston sleeves of the various stages. Conversely when the other port 104 is pressurized, oil will flow via passage 112 and chamber 94 and into pressurized engagement with the annular areas formed by the other ends of the piston and cylinder assemblies.

It should now be mentioned that as each of the various stages extend beginning with first stage 24, its movement with be arrested when the respective end surface or abutment 46 on its piston sleeve 44 engages an end stop 48-55. It should be mentioned that these end stops are integrally formed by the end closures 50, 57, 59, 61 and 63 of the various stages. Also, it should be noted that the piston and cylinder tube assembly of each stage utilizes its respective piston sleeve 44 and more particularly the end thereof as the stop engaging means for arresting the movement of the particular stage. Hence the need for any separate stop ring structure is completely eliminated by the present unique construction.

It will be noted from FIG. 1 that the central ram 32 is provided with a bore 120 which forms a bearing hole for the pivot pin on the load.

Reference is next made to the construction of the previously mentioned base means 22, which comprises an annular collar 126 provided with a recess surface 128 which is sized to slide over outer surface 130 on the end of the tubular housing. Annular collar 126 is provided with arcuate slots 132 which provide access for forming weld beads 134 which secure collar 126 to the end of the cylindrical housing.

With continued reference to FIG. 1, collar 126 includes bearing bushings 136, each of which includes a bearing hole 138 for receiving a pivot pin for mounting the base of the cylinder to the load.

At this point it should be pointed out that collar 126 is secured to housing means 22 only be welds 134 which are made at the very end of the housing means and on opposite sides thereof via the access slots 132, such that the only welding between the base collar 126 and cylindrical housing 20 is remote from the machined inner surface of cylinder wall 34 of the housing means as well as remote from the operating components within the housing means.

Hence, it will be understood that the bearing surfaces and operating components are, due to the particular attaching means for the base, remote from the intense heat necessarily applied during the welding operation.

Referring particularly to FIG. 2, the base means 22 further includes an inner base plate 140 joined to an outer base plate 142 at confronting surfaces 144 and 146. The outer base plate 142 is provided with a bore 147 and a cap screw 148 is extended through the bore and into threaded engagement with a hole 150 in inner base plate 140. It will be noted that outer base plate 142 includes a recess 152 that forms an annular groove that confronts an annular groove 154 in the cylindrical member in the housing member 20. A base snap ring 160 is removably disposed in the confronting grooves 152 and 154. Hence it will be understood that when the cap screws 148 are removed then outer base plate 142 can be pulled out of the bore. The base snap ring 160 is next contracted by gripping the ring at the leg holes 71 and pulled out of the bore. Hence the inner base plate 140 is now free to be pulled out of the outer bore.

In operation, when the central passage 94 is pressurized via extension port 104, then the fluid pressure exerted on the annular surfaces of the piston and cylinder assembly, will cause all of the stages to move out together. When this occurs it will be understood that the major force is exerted on the first stage 24 and such fluid force is transmitted mechanically to the next successive stages 26, 28, and 30 and thence to the central ram 32.

The first stage 22 will continue to extend until its stop-engaging shoulder 46 is arrested by stop 48 on front closure 50.

After extension of the first stage, stages two, three, four, and the center ram will start to extend and here the hydraulic stress imposed upon second stage 64 will be transmitted axially via stages three and four directly to the inner end 175 of central ram 32.

The stages will progressively extend with the central ram 32 moved to its full extension as the last movement of the assembly.

It will now be understood that due to the novel arrangement of the transfer disc 62-68 that the hydraulic forces exerted on the snap rings 70 and 90 through 94 are reduced to a minimum thereby permitting the use of such snap rings for the beneficial advantages of ease of fabrication and disassembly for servicing.

While the form of embodiment of the present invention as herein disclosed constitutes a preferred form, it is to be understood that other forms might be adopted.

What is claimed is:

1. A power cylinder comprising, in combination, an outer tubular housing means including a housing inner wall, a housing base end provided with a housing base opening, and a housing outer end provided with a housing outer opening; base means mounted on said housing base end and including an annular base member including an annular bore for receiving said housing base end, said base means further including a central base plate access opening axially aligned with said housing base opening, transverse bearing holes for pivotally receiving a base pivot pin, and a peripherally extending welding access slot overlapping said housing base end; a weld connecting said base means to said housing means at said housing base end; and piston means slideably mounted within said housing inner wall and including a ram portion extended outwardly through said housing outer opening.

2. A power cylinder comprising, in combination, an outer tubular housing means including a housing inner wall, a housing base end provided with a housing base opening, and a housing outer end provided with a housing outer opening; base means mounted on said housing base end and including an annular base member including an annular bore for receiving said housing base end, said base means further including a central base plate access opening axially aligned with said housing base opening, transverse bearing holes for pivotally receiving a base pivot pin, and a peripherally extending welding access slot overlying said housing base end; a weld connecting said base means to said housing means at said access slots; a base plate means removably mounted on said housing base end and including an inner annular base member and an outer annular base member removably fastened together at confronting base member surfaces, certain of said surfaces including an annular groove confronting an annular groove in said housing means; a snap ring removably mounted in said confronting annular grooves; and piston means slideably mounted within said housing inner wall and including a ram portion extended outwardly through said housing outer opening.

* * * * *